340-870.12 SR

OR 3,290,667

Dec. 6, 1966 — P. T. STINE — 3,290,667

AUTOMATIC FREQUENCY DEVIATION CONTROL SYSTEM FOR SUBCARRIER OSCILLATOR

Filed Sept. 30, 1963 — 2 Sheets-Sheet 1

FIG. I

INVENTOR
PAUL T. STINE

BY James D. Murray AGENT
Richard C. Reed ATTORNEY

*INVENTOR*
PAUL T. STINE

BY James B. Murray AGENT
Richard C. Reed
*ATTORNEY*

3,290,667
AUTOMATIC FREQUENCY DEVIATION CONTROL SYSTEM FOR SUBCARRIER OSCILLATOR

Paul T. Stine, 5900 Skyline Drive SE., Washington, D.C.

Filed Sept. 30, 1963, Ser. No. 312,800
2 Claims. (Cl. 340—184)

The invention described herein may be manufactured and used by or for the Government of the United States of America for governmental purposes without the payment of any royalties thereon or therefor.

This invention relates to telemetering systems and more particularly to a FM/FM telemetering system wherein the frequency deviation of the subcarrier oscillator, as caused by the sensor, is controlled by the use of a shaped filter to effect an optimum bandwidth utilization which includes maximum frequency response and fidelity simultaneously with maximum resolution.

The designer of FM/FM telemetering systems has previously been unable to obtain optimum subcarrier bandwidth utilization because of the necessity of limiting the frequency of the data in order that the fidelity at the data recorder would be adequate, or of reducing frequency deviation, and hence resolution, in order to achieve maximum frequency response.

It is, therefore, an object of this invention to provide a FM/FM telemetering system having an optimum bandwidth utilization which includes maximum frequency response and fidelity simultaneously with maximum resolution.

Another object of this invention is to provide passive filters which are suitable for use as emphasis and de-emphasis circuits in a FM/FM telemetering system.

A still further object of this invention is the provision of means in a FM/FM telemetering system which suitably emphasize, or shape, the sensor output and suitably de-emphasize, or restore, the subcarrier discriminator output to allow an optimum bandwidth utilization which includes maximum frequency response and fidelity simultaneously with maximum resolution.

Other objects and advantages of the invention will hereinafter become more fully apparent from the following description of the annexed drawings wherein.

Figure 1:
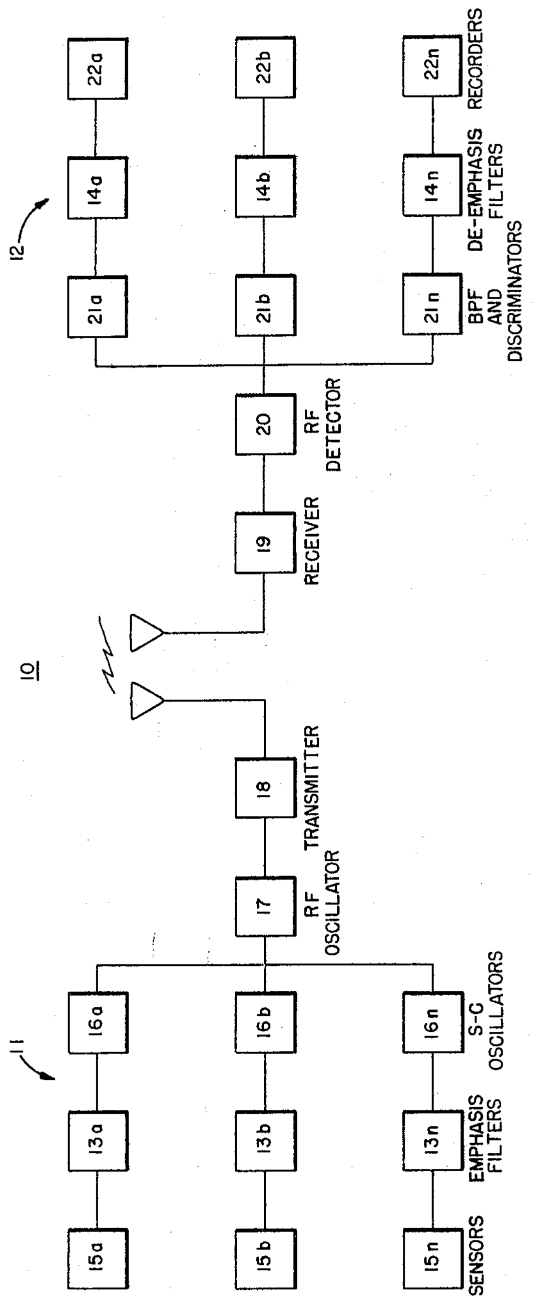
FIG. 1 is a block diagram of a FM/FM telemetering system according to this invention.

Referring now to the drawings, wherein reference characters designate like or corresponding parts throughout the several views, FIG. 1 is a block diagram of a FM/FM telemetering system 10 which includes the transmitting portion 11 and the receiving portion 12. System 10, except for the emphasis and de-emphasis filters 13*a*, 13*b* . . . 13*n* and 14*a*, 14*b* . . . 14*n*, is representative of the conventional FM/FM or frequency division telemetering systems which are currently well known. While system 10 has been illustrated as including a radio link, it will be obvious that the advantages of the invention are equally applicable to closed, or handwire, telemetering systems and other information transmission systems making use of frequency modulation, including frequency division telephone systems.

In the transmitting portions 11 of such conventional systems, condition sensors 15*a*, 15*b* . . . 15*n* produce an output, usually in the form of a varying voltage, which represents a particular condition and which output is conventionally used to directly frequency modulate the subcarrier oscillators 16*a*, 16*b* . . . 16*n*. However, according to the present invention, and for reasons which are later discussed, the outputs of the sensors 15*a*, 15*b* . . . 15*n* are connected to be first passed through emphasis filters 13*a*, 13*b* . . . 13*n*, after which these outputs are then used to frequency modulate the sub-carrier oscillators 16*a*, 16*b* . . . 16*n*. The outputs of the subcarrier oscillators are linearly added and frequency modulate the output of RF oscillator 17 which is transmitted by transmitter 18.

In the receiving portions 12 of such conventional systems, the signal is received by receiver 19 and demodulated by RF detector 20. The output of the detector is conventionally fed directly through band pass filters and discriminators 21*a*, 21*b* . . . 21*n* to recording or indicating instruments 22*a*, 22*b* . . . 22*n*. However, according to the present invention, de-emphasis filters 14*a*, 14*b* . . . 14*n*, which have characteristics inverse to the characteristics of emphasis filters 13*a*, 13*b* . . . 13*n*, are connected between the discriminators 21*a*, 21*b* . . . 21*n* and the utilizing instruments 22*a*, 22*b* . . . 22*n*.

It is presently the practice in the telemetery art to limit the majority of the band widths of the SCO (subcarrier oscillator) to ±7.5% of the center frequency of the band. To fully utilize this bandwidth a full variation of the sensor voltage would cause a swing, or frequency deviation, of the SCO equal to the full bandwidth. Such full utilization of the bandwidth was hitherto practical only for situations wherein the conditions being sensed varied slowly.

When the conditions being sensed can vary rapidly, as with transient accelerations or load due to vibration or flutter, the designer must consider the side currents which arise from the process of frequency modulation. If these side currents are excluded by the band pass filters in the subcarrier discriminators 21*a*, 21*b* . . . 21*n*, the fidelity of the recorded data will decrease. To preserve the fidelity, the designer is required to place correlated limitations on the frequency response range of the sensor, the frequency deviation of the SCO and on the discriminator output filter. As a result of these limitations, previous FM/FM telemetering systems have not approached the full frequency response capability of one-half the bandwidth.

It is known that resolution and signal-to-noise ratio $S/N$ are proportional to the deviation ratio or modulation index B which is defined as the frequency deviation $\Delta f$ of the SCO for full sensor voltage divided by the frequency of the sensor voltage $f_m$, or in equation form $$\frac{S}{N} \sim B = \frac{\Delta f}{f_m}$$

It is also known that the number of pairs of side currents having a value in excess of a predetermined percent of the unmodulated center frequency current increases as the modulation index B increases. It can be shown that for $B \leq 0.2$ the output of the SCO will include only one pair of side currents larger than 1% of the unmodulated center frequency current and that this pair of side currents will occur at the frequencies $f_0 \pm f_m$ where $f_0$ is the center frequency. As B increases, other pairs of side currents will become significant and the other pairs of side currents will occur at frequencies which are increasingly larger and smaller than the center frequency by increments of $f_m$.

The operational requirement of the system will frequently dictate minimum acceptable levels of resolution and of the side band retention or fidelity, which levels must be maintained throughout the operating range of the system. To meet the operational requirements, the designer must place correlated limitations on the rate of change or frequency range of the condition to which the sensor will respond and on the frequency deviation produced by the full sensor voltage for each of the SCO bands. This invention will eliminate the necessity of such limitations on frequency response other than the obvious limitation of one-half the full bandwidth of the subcarrier.

The basic concept of this invention is that for any one frequency of the sensor output $f_m$, the sensor signal may be suitably attenuated to control the frequency deviation $\Delta f$ of the SCO so that all significant side currents will pass through the BPF and the fidelity, resolution and overall bandwidth utilization will be simultaneously optimized. This concept can obviously be extended to include the full possible range of sensor frequency which is, for practical limits, from zero to one-half of the total subcarrier bandwidth, and when plotted, as in FIG. 2, provides the attenuation characteristics of the emphasis filters 13*a*, 13*b* . . . 13*n*.

Figure 2:
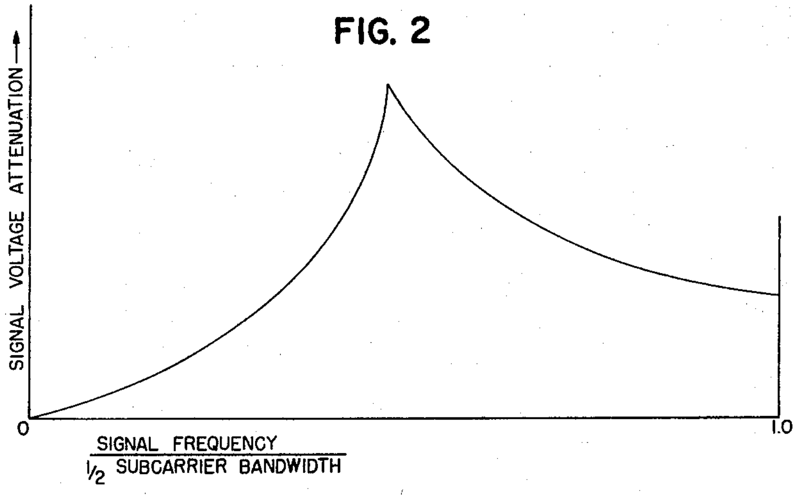
FIG. 2 is a plot showing the desired attenuation characteristics of the emphasis filter of this invention.

It should be noted that the filter characteristic shown in FIG. 2 has been normalized to one-half the subcarrier bandwidth and is therefore applicable for any subcarrier center frequency and for any subcarrier bandwidth. As indicated in FIG. 2, the filter characteristic provides a maximum attenuation at a signal frequency of approximately one-half of the maximum signal frequency and progressively decreasing attenuation on both sides of the maximum. The magnitude of maximum attenuation is a function of the required fidelity of signal reproduction.

It is, of course, necessary to restore the attenuations so that the recorder will accurately reproduce the output of the sensor. This can best be done by connecting the de-emphasis filters 14*a*, 14*b* . . . 14*n* between the discriminators 21*a*, 21*b* . . . 21*n* and the recorders 22*a*, 22*b* . . . 22*n*. The characteristics of the de-emphasis or restoring filters are the inverse of the characteristics of the emphasis filters.

Figure 3:
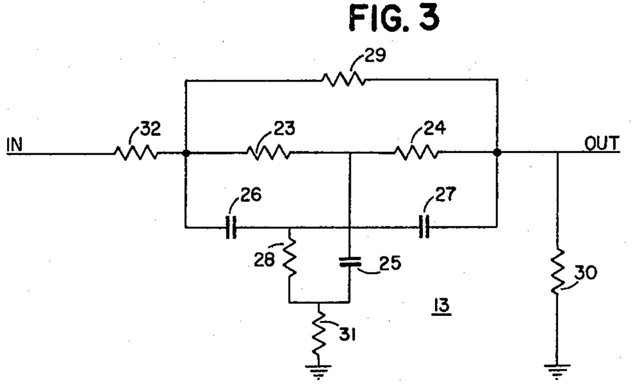
FIG. 3 illustrates a circuit suitable for use as an emphasis filter.

FIG. 3 shows a bridged parallel-T network which has proven satisfactory for use as the emphasis filters 13*a*, 13*b* . . . 13*n*, although any filter having the desired characteristics could be used. The component values of the T sections 23, 24, 25 and 26, 27, 28, the bridging resistor 29, the load resistor 30, the retuning resistor 31 and the generator resistor 32 must necessarily be determined, by well known methods, in accordance with the attenuation curves, such as in FIG. 2, for each band and for prescribed levels of the resolution and fidelity.

Figure 4:
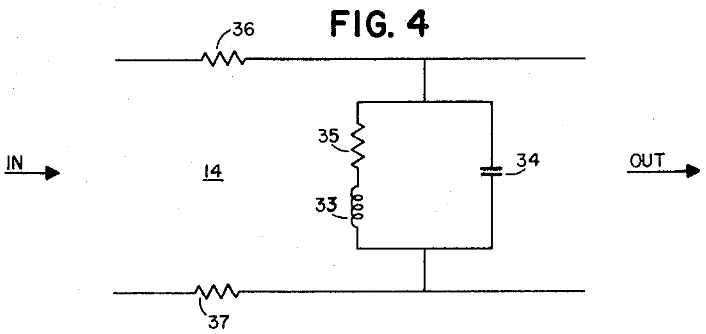
FIG. 4 illustrates a circuit suitable for use as the de-emphasis filter.

FIG. 4 shows an L–C parallel resonant voltage divider network which has been successfully used as the de-emphasis filters 14*a*, 14*b* . . . 14*n*, although any filter having characteristics inverse to the characteristics of the emphasis filters 13*a*, 13*b* . . . 13*n* could be used. The L–C tank circuit 33, 34 should be designed to resonate at the frequency of maximum de-emphasis gain. The tank series resistor 35 and the external parallel resistors 36 and 37 are varied to obtain the desired inverse characteristic. A small adjustment of the capacitance may be necessary to maintain the desired resonant frequency as the resistances are varied.

The invention described will permit FM/FM telemetering systems to be designed to have an optimum bandwidth utilization which includes maximum frequency response and fidelity simultaneously with maximum resolution by using passive filters to provide suitable emphasis at the subcarrier oscillator and suitable complementary receiver de-emphasis at the subcarrier discriminator output.

Obviously many modifications and variations of the present invention are possible in the light of the above teachings. It is therefore to be understood, that within the scope of the appended claims, the invention may be practiced otherwise than as specifically described.

What is claimed is:

1. A FM/FM telemetering system comprising:

a transmitting portion and a receiving portion, said transmitting and receiving portions being cooperatively coupled;

said transmitting portion comprising:

transmitting means for transmitting an RF signal to said receiving portion and including an RF oscillator coupled to a transmitter;

a plurality *n* of subcarrier channels, each of said plurality of subcarrier channels being coupled to said RF oscillator and including condition sensor means, emphasis filter means and subcarrier oscillator means, said emphasis filter means coupling said sensor means to said subcarrier oscillator means;

each of said subcarrier oscillator means having a different center frequency and a bandwidth which is a predetermined percentage of said center frequency;

each sensor means being operatively adapted and arranged to sense a condition and to produce an electrical signal which has a permissible frequency range from zero to a maximum signal frequency and each of said emphasis filter means having an attenuation vs. frequency characteristic such that the maximum attenuation occurs at a frequency which is one-half of said maximum signal frequency, said attenuation progressively decreasing at frequencies increasingly remote from the frequency of maximum attenuation;

said receiving portion comprising:

receiving means for receiving said RF signal from said transmitting means and including an RF detector coupled to a receiver;

a plurality *n* of receiver channels, each of said receiver channels being coupled to said RF detector and including recording means, de-emphasis filter means and band pass filter and discriminator means;

each of said de-emphasis filter means having an attenuation vs. frequency characteristic which is the inverse of the attenuation vs. frequency characteristic of different ones of said emphasis filter means.

2. A FM/FM telemetering system as set forth in claim 1 and each of said emphasis filter means being a bridged parellel-T network.

References Cited by the Examiner

UNITED STATES PATENTS

| | | | |
|---|---|---|---|
| 2,179,182 | 11/1939 | Hansell | 325—46 |
| 2,212,338 | 8/1940 | Brown | 325—46 |
| 2,286,494 | 6/1942 | Lynn et al. | |
| 2,503,540 | 4/1950 | Augustadt | 333—28 |
| 2,917,623 | 12/1959 | Crosby | 325—47 X |
| 3,064,075 | 11/1962 | Hurford. | |
| 3,096,401 | 7/1963 | Chaney et al. | 340—207 X |

OTHER REFERENCES

Kiebert, M. V.: Multichannel FM-FM Telemetering System, Tele-Tech, March 1952, pp. 60–62.

NEIL C. READ, *Primary Examiner.*

DAVID G. REDINBAUGH, *Examiner.*

T. W. CALDWELL, T. B. HABECKER, *Assistant Examiners.*